United States Patent [19]

Huddleston

[11] 4,027,929

[45] June 7, 1977

[54] BEARING LUBRICATOR

[75] Inventor: Jack M. Huddleston, Fort Gibson, Okla.

[73] Assignee: National Distillers and Chemical Corporation, New York, N.Y.

[22] Filed: Sept. 12, 1975

[21] Appl. No.: 612,893

[52] U.S. Cl. .................................. 308/97; 184/1 D
[51] Int. Cl.² ......................................... F16C 1/24
[58] Field of Search ...................... 308/78, 93, 97; 184/1 D, 105 R, 105 A, 105 B, 105 C

[56] References Cited

UNITED STATES PATENTS

| 2,158,879 | 5/1939 | Manning | 184/105 R X |
| 2,591,129 | 4/1952 | Brouwer | 184/1 D |
| 3,180,533 | 4/1965 | Sundholm | 184/105 B X |
| 3,589,470 | 6/1971 | Dorn | 184/1 D |

Primary Examiner—Joseph F. Peters, Jr.
Assistant Examiner—Gene A. Church
Attorney, Agent, or Firm—Kenneth D. Tremain

[57] ABSTRACT

A bearing lubricator constituted by a tubular element providing a lubricant receiving chamber adjacent one extremity thereof, said chamber having an open mouth for the reception and secure retention of an outwardly projecting lubricating fitting, the remainder of said tubular element being arcuately flattened to provide an angularly offset and gradually tapered portion terminating in an arcuate discharge orifice at the extremity remote from the lubricating fitting, the cross-sectional relationship between the lubricant receiving chamber and the discharge orifice being on the order of 10:1.

7 Claims, 6 Drawing Figures

BEARING LUBRICATOR

This invention relates to lubricating devices and more particularly to a device or adapter intended for use in connection with the lubrication of bearings or the like which are not readily accessible and where, under prior art practices, it has been necessary to dismantle the assembly to a sufficient degree so as to physically reach and expose the bearing where lubrication is required. This generally is a particularly time-consuming operation.

Under circumstances where the bearing is located within a sealed lubrication area, seals must be removed before the bearing can be packed with grease, or otherwise lubricated, and installation of new seals is required, thus further increasing the cost of the operation.

A field of particular interest is in connection with the lubrication of the inner bearings of wheels on vehicles which have disc braking systems on the front wheels thereof. In connection with such vehicles, under prior art practices, the procedure recommended by most automotive manufacturers requires that each front wheel assembly be completely dismounted, the inner bearing removed and packed with lubricant, and the procedure then reversed for re-assembly. Highly skilled labor is required and extreme care must be exercized while expanding the disk pads and securing the brake calipers during dis-assembly to avoid damaging the hydraulic brake system. The foregoing procedure entails the following steps:

1. Raise vehicle on lift
2. Remove inner brake bolts
3. Insert disc pad expander as brake calipers are removed from disc
4. Secure brake cylinders to vehicle chassis
5. Remove outer securing nut and bearings
6. Remove hub from axle
7. Remove hub inner seal
8. Pack bearings with suitable lubricant
9. Install new seals
10. Reverse procedure for re-assembly
11. Adjust bearing pressure in accordance with manual specifications.

Observation of skilled service station personnel discloses that an average time of one and one-half hours is required to pack the front wheel bearings on an automotive vehicle and in many instances the mechanic must employ a helper to remove the calipers which may weigh from five to ten pounds.

In marked distinction the procedure required in connection with the utilization of the present invention includes only the following steps:

1. Raise vehicle on lift
2. Remove outer securing nut and outer bearing
3. Insert lubrication adapter through the hub until contact is made with inner bearing; raise or lower the adapter to obtain reference into bearing keeper; give a single pump with hand gun or power equipment; move the adapter 180° (within the hub) and repeat
4. Remove excess grease from hub interior with adapter
5. Pack and install outer bearing
6. Adjust bearing pressure in accordance with manual specifications.

Following the above inventive teachings will permit one mechanic (with but minimum skills) to lubricate the inner bearings of the front wheels of vehicles having disc braking systems in one-half hour and obviate potential damage to other components.

It is a major object of the present invention to provide a novel device or adapter for a grease gun whereby inner wheel bearings may be lubricated without necessity for removing the wheel hub or disturbing the wheel assembly other than by the removal of the outer bearing.

It is a further object of the invention to provide a novel device or adapter of the character with which we here are concerned whereby normally inaccessible inner bearings may be lubricated with particular ease and convenience with but minimum requirements for any dis-assembly so as to provide physical access to the bearing to be lubricated.

It is a still further object of the present invention to provide a novel device or grease gun adapter which is of particularly simple and unitary construction, will not require skilled labor in connection with the use thereof, will have long life, and may be manufactured with extreme economy.

Further objects and advantages of the invention will be readily apparent from the following specification, taken in connection with the accompanying drawings, wherein.

Figure 1:
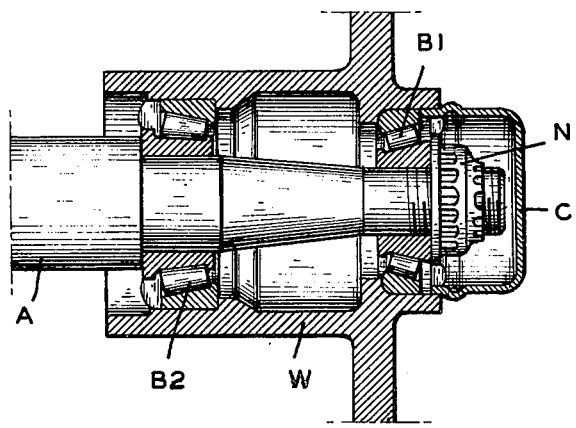
FIG. 1 is a fragmentary sectional view illustrating, somewhat diagrammatically, an extremity of a vehicle axle with a wheel hub mounted thereupon in conventional manner upon inner and outer bearings.
Figure 5:
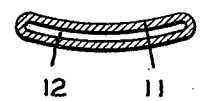
FIG. 5 is a transverse sectional view, also on an enlarged scale, taken on the line 5—5 of FIG. 3.

As shown more particularly in the drawings, the device or adapter 10 of the present invention preferably is produced from a length of cold rolled steel tubing having an exterior diameter on the order of ¾ inch and a wall thickness on the order of 20 gauge. A convenient length of the adapter is approximately 8½ inches; however, these dimensions may vary under special circumstances where larger or smaller adapters may be required.

The preferable method of forming the adapter includes the step of arcuately or concavely compressing approximately 65% of the tube length to provide an arcuately flattened portion 11 providing a restricted passageway terminating in an extremity or discharge orifice 12 restricted to approximately 10% of the tube diameter. A highly unexpected result of this forming technique is that the flattened portion of the adapter assumes an angular relationship, reference being had to the longitudinal axis, varying some 15° from that of the balance of the tubing and thus providing a hand-hold portion or handle 13 at the opposite extremity thereof. This hand-hold portion 13 constitutes a chamber 4 for containing lubricant and the interior diameter of the adapter 10 tapers gradually from the inner extremity 15 of the chamber 14 to the discharge aperture or orifice 12. It will be understood that the chamber 14 includes an open mouth 16 at the extremity of the adapter remote from the discharge orifice.

A conventional hydraulic lubricating fitting 17 is then threaded into a plug or the like 18, this plug having an exterior diameter complementary to the interior diameter of the adapter mouth. The plug is then press-fitted into the open mouth 16 of the adapter and, to insure a permanent seal, the peripheral edge of the tube is rolled down as indicated at 19 thereby insuring against separation of the adapter 10 from the fitting 17 or lateral movement therebetween.

Figure 2:
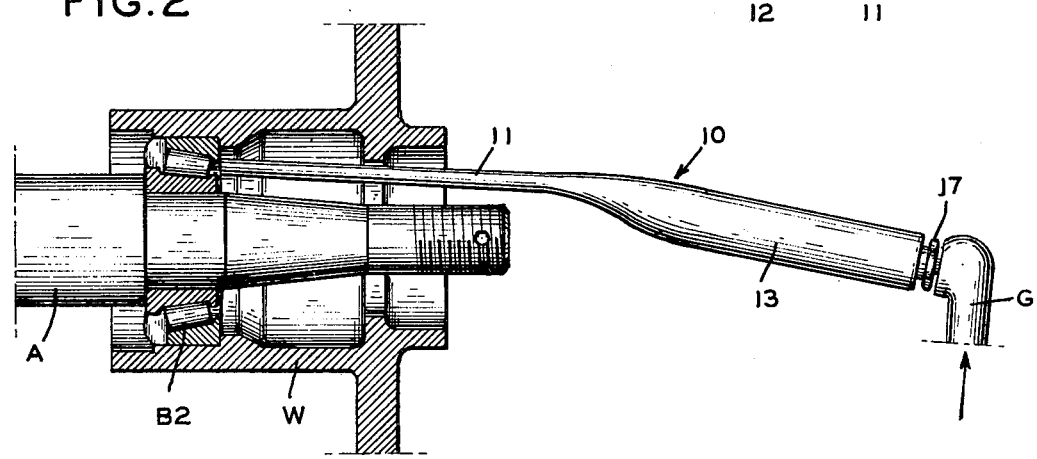
FIG. 2 is a fragmentary sectional view, similar to FIG. 1, with the hub cap, axle nut and front bearing removed and the lubricating device or adapter of the present invention in operative position for lubricating the rear bearing.
Figure 6:
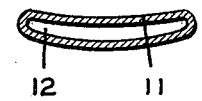
FIG. 6 is a similar transverse sectional view taken on the line 6—6 of FIG. 3.
Figure 3:
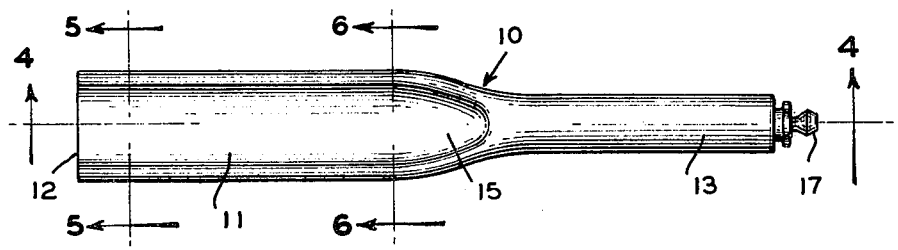
FIG. 3 is a bottom plan view of the lubricating adapter.
Figure 4:
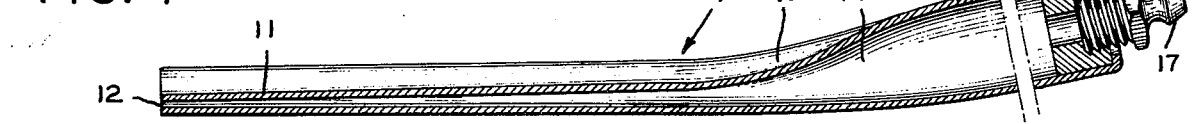
FIG. 4 is a fragmentary sectional view on a somewhat enlarged scale taken on the line 4—4 of FIG. 3.

The simplicity of operation or utilization of the invention is clearly shown in FIGS. 1 and 2 of the drawings where there is illustrated the extremity of an axle A, axle nut N and cap C. The wheel hub W is mounted upon inner and outer bearings B1 and B2, respectively, received in conventional bearing raceways. To lubricate the inner bearing B2, all that is required is the removal of the cap, nut, and outer bearing B1. The adapter 10 is then inserted through the hub until contact is made with the inner bearing and minimum movement of the adapter extremity will provide registry with or reference into the bearing keeper and a single pump with a hand gun or power equipment G applied to the fitting 17 will provide bearing lubrication. The tool may then be moved 180° (without removal from the bearing keeper being required) and the operation repeated. Where there may be excess lubricant within the hub, this is readily removable by the adapter extremity.

The arcuate cross-sectional configuration of the flattened portion of the adapter permits ready rotative movement within the wheel hub in an annular path paralleling the periphery of the axle and insures retention of the discharge extremity of the adapter within the bearing keeper when the adapter is moved 180° to provide a second shot of lubricant. The angular relationship between the axis of the handle portion 14 and that of the arcuately flattened portion 11 conveniently insures accurate registry of the adapter discharge extremity with the bearing to be lubricated.

There has thus been described a lubricating adapter, particularly suitable for the lubrication of inner wheel bearings on vehicles having disc braking systems on the front wheels thereof, which may be manufactured with particular economy and will eliminate any need for removal of wheels, rotors, calipers and brake lines. Skilled labor is not required in connection with the use thereof and completely satisfactory lubrication can be achieved.

It will be obvious to those skilled in this art that various changes may be made in the invention without departing from the spirit and scope thereof and therefore the invention is not considered as limited to that which is shown in the drawing and described in the specification and reference is had to the claims for summaries of the essentials of the invention, novel features of construction, and novel method of manufacture, for all of which protection is desired.

What is claimed is:

1. A bearing lubricator comprising a tubular element having a hand-hold portion at the outer extremity thereof, an intermediate inwardly tapered portion, and an elongated and angularly offset restricted passageway extending inwardly from the opposite extremity of said tubular element and communicating with said inwardly tapered portion, said restricted passageway terminating in a narrow elongate arcuately curved discharge orifice; a lubricant receiving chamber having an open mouth extending inwardly through said hand-hold portion to said intermediate inwardly tapered portion and communicating therewith; and an outwardly projecting lubricating fitting securely mounted within said open mouth in sealed relationship with respect to said lubricant receiving chamber.

2. A bearing lubricator as set forth in claim 1 where the longitudinal axis of said angularly offset restricted passageway varies on the order of 15° from that of said hand-hold portion.

3. A bearing lubricator as set forth in claim 1 where the cross-sectional area of said arcuate discharge orifice is on the order of 10% of that of said lubricant receiving chamber.

4. A bearing lubricator as set forth in claim 1 where the length of said elongated restricted passageway is on the order of 65% of the entire length of said tubular element.

5. A bearing lubricator as set forth in claim 1 where a plug having a threaded bore extending therethrough is mounted within the open mouth of said lubricant receiving chamber, the peripheral edge of said tubular element being rolled inwardly to retain said plug in sealed relationship, and said lubricating fitting is threaded into the bore of said plug.

6. A bearing lubricator as set forth in claim 5 where the longitudinal axis of said angularly offset restricted passageway varies on the order of 15% from that of said hand-hold portion, where the height of said discharge orifice is on the order of 10% of the diameter of said lubricating chamber, and where the length of said elongated restricted passageway is on the order of 65% of the entire length of said tubular element.

7. The method of producing a bearing lubricator which includes the steps of taking a length of tubular material having an open mouth at each extremity thereof, mounting an outwardly extending lubricating fitting in one extremity of said tubular material in sealed relationship with respect to the interior thereof, compressing said tubular material concavely for substantially 65% of the length thereof commencing from the extremity remote from said lubricating fitting to provide an arcuate discharge orifice restricted to on the order of 10% of the original diameter thereof, and producing an angularly offset restricted passageway within said tubular material extending inwardly from said discharge orifice, the longitudinal axis of said restricted passageway varying on the order of 15% from the longitudinal axis of the remainder of said tubular material.

* * * * *